Figure 7:
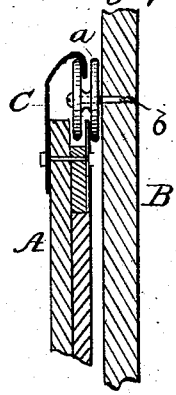
Figure 8:
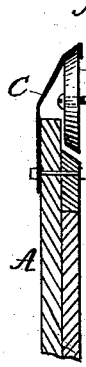
Figure 9:
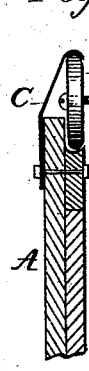
Figure 10:
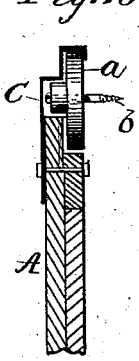
Figure 11:
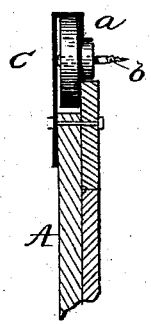
Figure 12:
Figure 13:
Figure 14:
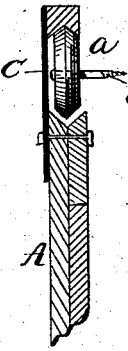

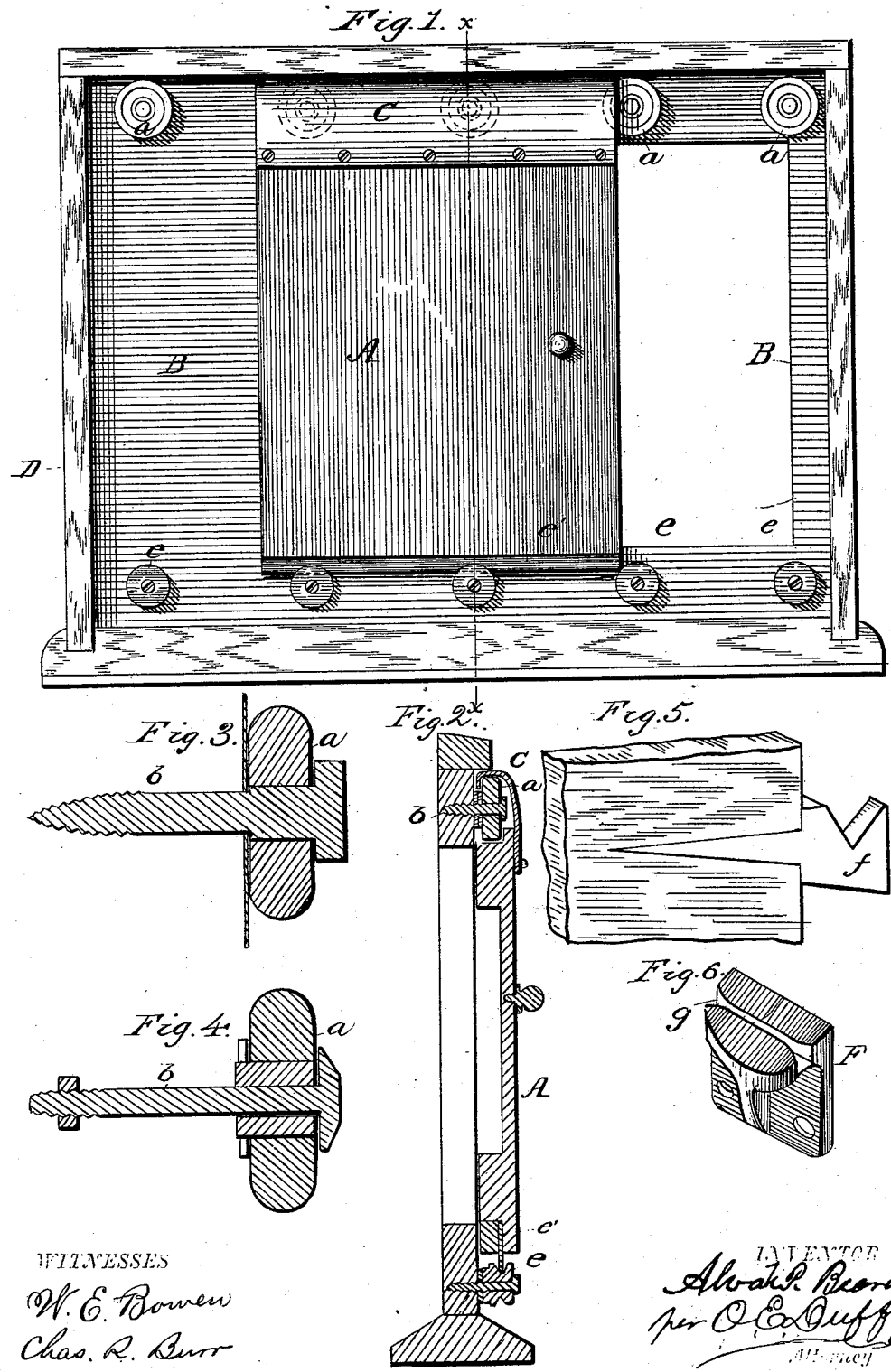

(No Model.) 2 Sheets—Sheet 2.

A. P. BEARD.
SLIDING DOOR.

No. 281,433. Patented July 17, 1883.

Witnesses:
J. M. Reynolds
Edward E. Ellis

Inventor:
Alvah P. Beard
per O. E. Duffy
Atty

UNITED STATES PATENT OFFICE.

ALVAH P. BEARD, OF HORSEHEADS, NEW YORK.

SLIDING DOOR.

SPECIFICATION forming part of Letters Patent No. 281,433, dated July 17, 1883.

Application filed February 24, 1883. (No model.)

*To all whom it may concern:*

Be it known that I, ALVAH P. BEARD, of Horseheads, in the county of Chemung and State of New York, have invented certain new and useful Improvements in Sliding Doors; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My improvements relate to that class of inventions known as "sliding doors;" and it consists in the combination of a series of fixed carrier-rollers secured in the upper cross-piece of the door-frame, with the door suspended thereon by a sheath, which is formed to partly embrace said rollers, and a strip secured in the bottom of the door, moving in guides which are arranged on the bottom cross-piece of the door-frame, substantially as will hereinafter more fully appear.

In the drawings, Figure 1 represents a front view of a door and frame embodying my improvements. Fig. 2 is a vertical section thereof on the line $x\ x$ of Fig. 1. Figs. 3 and 4 are sectional views of the carrier-rollers, showing different modes of securing them on the screws which form their journals. Fig. 5 is a view of a modified means for serving as a guide for the bottom side of the door. Fig. 6 is a perspective view of a metal bracket provided with a channel, also designed for a guide. Figs. 7, 8, 9, 10, 11, 12, 13, and 14 are vertical sections, partly cut away, showing the different modes or forms of hangers or runlets as used on the door to embrace rollers of different contour; and Figs. 15 to 21 are modifications of the hanging supports for the door.

Figures 15, 16, 17:
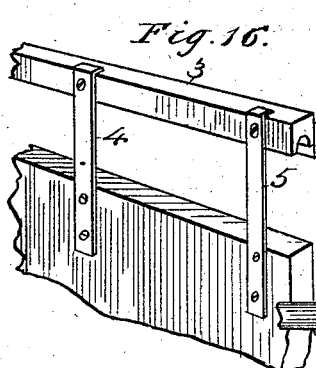
Figure 16:
Figure 18:
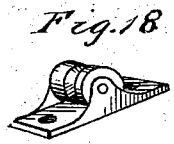
Figures 19, 20, 21:
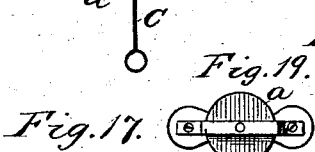

Referring more particularly thereto, A is the door; B, the partition or wall, and C the sheath secured on the side of the door A, near its top. The door is suspended by this sheath on the carrier-rollers, over the top of the opening in the wall or other place that it is designed to close, and enough of these rollers are employed to extend a sufficient distance to the side thereof to enable the door to be drawn back far enough to expose said opening, it being stopped and prevented from running off the rollers by coming in contact with the framework D, which surrounds the opening. The sheath may consist of metal or other material, and being secured on the door, as described, and is made to travel on the carrier-rollers when the door is either opened or closed, the rollers $a$ being termed "stationary," in that they themselves do not travel the track, but turn on the screws $b$, by which they are secured to the wall. The door is held by the sheath, which, as shown in Fig. 2, is partly turned over at the top to fit over and partly embrace the rollers $a$, so as to be held thereon, said rollers, in this instance, being rounded on their edge; but, instead of the hanger or sheath being turned to embrace rollers of rounded contour, it can be so formed as to embrace those whose periphery is flat, grooved, concave, convex, semi-convex, &c., the hanger in each or any instance being so formed and turned over as to conform to the contour of the roller to permit easy sliding thereon of the door through the medium of said hanger, as will be seen upon reference to the several modifications shown in Figs. 7 to 14, inclusively. As shown in Fig. 15, the door is represented as being suspended by the hanger, having two embracing points on a carrier, having two rollers, each of said points running on a roller held by an arm, 1 1, of the carrier. Fig. 17 shows a carrier having one arm carrying two rollers, the hanger being so formed to embrace and travel on each. Fig. 16 shows a modification of the hanger or sheath. In this figure it is shown as being a strip held above the top edge of the door by two metal supports, 4 5, the strip on the under side being concaved to travel on a roller whose contour is rounded. Fig. 18 represents a view of a support for a roller, which roller is grooved on its periphery. The remaining figures are views of modified ways of making the carrier-rollers with bearings provided therefor, and means for securing them to the wall or partition upon which the door is to be hung.

$c$ represents a series of guide-rollers secured to the wall or partition B at the bottom. These rollers are provided with grooves on their periphery, within which works the metal strip $e'$, secured to the door on the bottom, and acting to retain the door in position and prevent it from sidewise movement; but instead of these guides may be employed the V-shaped guide $f$, (shown in Fig. 5,) provided with a spike end, by which it is driven into the wall or frame; or, in lieu of these features, I have shown a substantial equivalent in the form of a metal bracket, F, Fig. 6. This bracket is formed with a channel, $g$, within which is guided the strip $e'$.

I would like to state here that the weight of the door is entirely upon the carrier-rollers, the metal sheath being the hanging means therefor, and the door opening and closing, the sheath traveling on the rollers.

Instead of as many rollers being employed as herein shown, it is obvious that only one may be used—as, for instance, the center one—and either one of the herein-mentioned guides used in place of the other rollers on either side; but for the purpose of obtaining the least possible friction I prefer to use the carrier-rollers at the top, as explained in either one of the modified forms shown, and the sheath formed in accordance therewith, as stated. I prefer to make the sheath C of a length equal to the width of the door, which serves as a great protection to the carrier-rollers from the weather, and also shields the door.

It will be apparent that my improvements will be applicable to sliding doors of all kinds— such as car-doors, barn-doors, gates, and doors for dwellings. It will be seen by my construction of sliding door that the least possible amount of friction is generated, and that I avoid the necessity of forming a track above the door-frame, and also avoid the use of carriages secured on the door, within which are journaled rollers for traversing the track, the means employed by me rendering such structure more complete and cheap.

Having thus described my invention, what I claim as new, and desire to secure by Letters Patent, is—

1. In a sliding door, the combination of a door with the hanger forming a track, suspended on fixed carrier-rollers, said hanger being curved to embrace the upper part of said rollers, said door being adapted to be opened or closed by the movement of the track on the rollers, as described.

2. In a sliding door, the combination of the fixed carrier-rollers with the door suspended thereon by the sheath, as described, and the metal strip in the bottom of said door, moving in guides, substantially as set forth.

3. In a sliding door, the combination of the door, with the sheath secured thereto at its top, with the carrier-rollers working on suitable fixed bearings secured in the wall, the frame D, the strip $e'$ in the bottom of the door, and the guides, all substantially as shown.

4. The combination, in a sliding door, of fixed carrier-rollers of any contour, with the door suspended thereon by the sheath, as described, said sheath being turned to partly embrace the rollers, which embracing portion is formed of corresponding contour to the rollers, and the guide-strip working in guides, substantially as described.

In testimony that I claim the foregoing as my own I affix my signature in presence of two witnesses.

ALVAH P. BEARD.

Witnesses:
   B. F. MORSELL,
   O. E. DUFFY.